Aug. 19, 1947.   N. F. BRIGNOLA   2,425,917
EAR SPATULA
Filed March 12, 1945
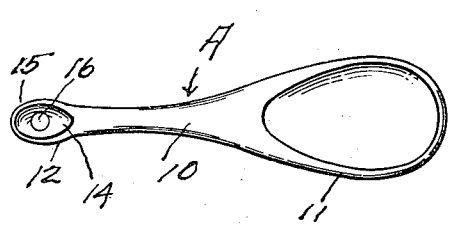
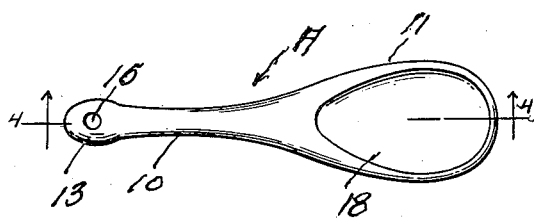
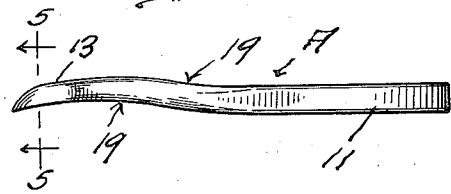
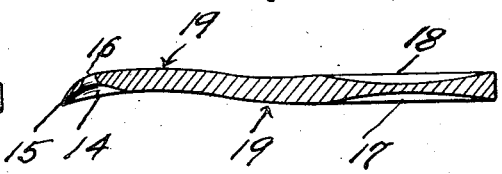
Inventor
Nicholas F. Brignola,
By
Attorney Patented Aug. 19, 1947

2,425,917

UNITED STATES PATENT OFFICE 2,425,917

EAR SPATULA

Nicholas F. Brignola, Troy, N. Y.

Application March 12, 1945, Serial No. 582,198

1 Claim. (Cl. 128—303)

The invention relates to an ear spatula or wax remover implement, and more particularly to a hand manipulated ear spatula or wax remover instrument.

The external auditory canal in the human adult is approximately four (4) cm. in length, if measured from the tragus, which extends over the outer end of the canal, and from the bottom of the concha to the ear drum, the canal extends about 2.5 cm. The canal forms a slight S-shaped curve which is first directed inward and forward, then slightly upwards and backwards and finally inward, forward and slightly downward. The canal is more or less oval and cylindrical. Cerumen or ear wax is usually present in the outer two-thirds extent of the canal, since the oily and hairy glands are more abundant and concentrated in this area.

The primary object of the present invention is the provision of an implement or instrument of this character, wherein its stem or shank is so angulated and shaped that it is easily inserted into the canal of the ear without injuring the drum, the length of the said stem or shank being such that the ear drum cannot be perforated, as such length is less than the length of the said canal.

Another object of the invention is the provision of an implement or instrument of this character, wherein the hand grasping terminal of the same is depressed in opposite faces thereof to accommodate the thumb and first finger of a hand at the tips to permit the easy and proper handling of such implement or instrument, the latter being useable either by the right or left hands.

A further object of the invention is the provision of an implement or instrument of this character, wherein the cerumen or wax extracting terminal is of special construction so as to gather the cerumen or wax and clean the canal, to free it thereof, without in any manner injuring the latter, and at the same time anchoring the cerumen or wax to the said implement or instrument for complete removal of the latter.

A further object of the invention is the provision of an implement or instrument of this character, wherein its construction conforms to the anatomy of the ear canal, and will not damage the tissues thereof or the ear drum in the use of the said implement or instrument for the removal of cerumen or wax.

A still further object of the invention is the provision of an implement or instrument of this character, which is simple in construction, thoroughly reliable and efficient in operation, strong, durable, readily and easily handled, easy to clean or sterilize, conveniently carried on the person, and inexpensive to manufacture.

With these and other objects in view the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a plan view of the implement or instrument constructed in accordance with the invention.

Figure 2 is a similar view looking toward the opposite face thereof.

Figure 3 is a side edge view.

Figure 4 is a sectional view taken on the line 4—4 of Figure 2 looking in the direction of the arrows.

Figure 5 is a sectional view taken on the line 5—5 of Figure 3 looking in the direction of the arrows.

Similar reference characters indicate corresponding parts throughout the several views in the drawing.

Referring to the drawing in detail, A designates generally the ear spatula or wax remover in its entirety and constructed in accordance with the invention, as hereinafter fully described.

The implement or instrument A, comprises a stem or shank 10, having a substantially oval or egg shape, in cross section, enlarged terminal forming a thumb and finger tip hand gripping handle 11, at one end, while at the other end of such stem or shank is a cupped terminal head 12, which is considerably reduced or smaller in size than the gripping handle. The terminal head 12 is formed with a convexed outer face and a concaved inner face 13 and 14, respectively, both merging into a blunt edge marginal lip 15, slightly protruding beyond the concaved inner face 14. The head 12 is provided with a central aperture 16 opening through its faces 13 and 14. This head 12 is the cerumen or wax removing end of the implement or instrument A.

The handle 11 in opposite side faces thereof has depressions 17 and 18, respectively, the depression 17 being adapted in its shape for thumb tip seating, while the depression 18 is adapted for the seating of the tip of the first finger of a hand, either right or left hands, so that the implement or instrument can be properly grasped and manipulated for the removal of cerumen or wax from the ear canal, the said implement or instrument being usable in the right hand or the left hand, optionally.

The stem or shank 10 is angulated at 19, and gradually tapers from the handle 11 to the head 12, the surface of the implement or instrument being smooth throughout, and such implement or instrument can be made from plastic material or any other suitable materials, affording strength and durability, with minimum of weight thereto. The entire length of the implement or instrument should be less than 2.5 cm. and its thickness should not exceed ½ cm.

The formation of the head 12 of the implement or instrument A when inserted in the ear canal, through manipulation, enables the cerumen or wax to be extracted from the said canal, and the adhering of the cerumen or wax to such head, the anchoring of the cerumen or wax to the latter being effected by the presence of the aperture 16 for complete removal from the canal. The head 12 does not injure the tissues of the canal, and by reason of the length of the stem or shank 10 the drum of the ear cannot become punctured or injured.

What is claimed is:

A spatula of the kind described, comprising a body of substantially equal thickness throughout its major extent and having a flat substantially oval shaped terminal portion forming a finger-and-thumb gripping handle provided with concaved recesses in opposite faces thereof creating the proper sized thumb-tip and index-finger tip pad receiving depressions, respectively, an outwardly tapered shank extending longitudinally from the terminal portion following the center longitudinal axis of the said body and a tip terminating the shank at a determined distance removed from the said terminal portion, the shank and tip being reversely angulated to each other in a longitudinal direction of the body, the shank also being angulated to the said terminal portion.

NICHOLAS F. BRIGNOLA.

REFERENCES CITED

The following references are of record in the file of this patent:

UNITED STATES PATENTS

| Number | Name | Date |
|---|---|---|
| 1,863,449 | Lees | June 14, 1932 |
| 147,660 | Leiner | Feb. 17, 1874 |
| 906,085 | Tolman | Dec. 8, 1908 |
| 293,718 | Clark | Feb. 19, 1884 |

OTHER REFERENCES

General Catalog of V. Mueller & Co. (1938), p. 320, article G. S. 475.